No. 872,111.  
PATENTED NOV. 26, 1907.  
W. L. DOW.  
BUILDING BLOCK.  
APPLICATION FILED JAN. 25, 1906. RENEWED SEPT. 12, 1907.

WITNESSES  
OMWahlstrom  
J.H. Baldwin

INVENTOR  
WALLACE L. DOW  
BY Paul & Paul  
HIS ATTORNEYS.

UNITED STATES PATENT OFFICE.

WALLACE L. DOW, OF SIOUX FALLS, SOUTH DAKOTA.

BUILDING-BLOCK.

No. 872,111.            Specification of Letters Patent.        Patented Nov. 26, 1907.

Application filed January 25, 1906. Serial No. 297,773. Renewed September 12, 1907. Serial No. 392,572.

*To all whom it may concern:*

Be it known that I, WALLACE L. DOW, of Sioux Falls, Minnehaha county, South Dakota, have invented certain new and useful Improvements in Building-Blocks, of which the following is a specification.

My invention relates to artificial building blocks, and the object of the invention is to provide means whereby a dead air space can be formed in a wall, and the block sections united across such space without the necessity of embedding the connection in the block when it is molded, thereby facilitating the manufacture of the block and avoiding the necessity of inserting the bridging means into the mold each time a block is formed.

The invention consists, generally, in providing a bridging plate adapted to bond the ends of two block sections together and put in place during the erection of the wall.

Figure 1:
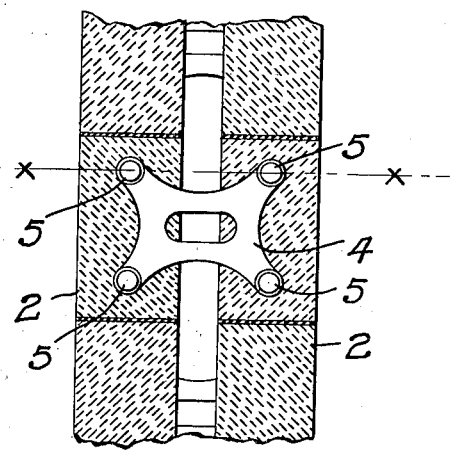
Figure 2:
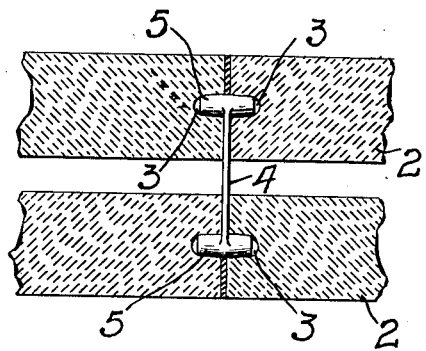
Figure 3:
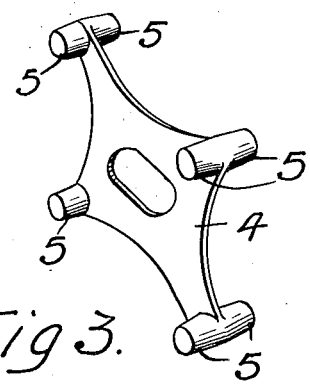

In the accompanying drawing forming part of this specification, Figure 1 is a vertical sectional view of a wall illustrating the position of the bridging plate therein. Fig. 2 is a sectional view on the line x—x of Fig. 1. Fig. 3 is a perspective view of the plate separated from the block.

In the drawing, I have shown each block composed of two rectangular sections 2 corresponding to one another in size and shape, and capable of being molded separately and assembled when the wall is to be built, any suitable width of air space being provided between the block sections according to the character of the wall being erected. It has been customary, where blocks are formed with a dead air space between their inner and outer walls to mold the two sections simultaneously and connect them by a suitable bridging means which is embedded at the ends in the block sections, thus tying or bonding them together. I have found, however, that there are several objections to a block made in this way. A larger and more expensive mold is required, more time is consumed in forming the blocks and bonding the sections together, and it is more difficult, particularly in the manufacture of large blocks, to handle them where an air space is formed between the sections in the mold and the bridging means has its ends embedded in the sections; furthermore, the width of the air space cannot be varied when the block sections are united in the mold. I therefore dispense with all bridging means used in the molding operation, and provide a suitable mold wherein, if desired, each block section may be molded separately and provided with sockets 3 arranged one above another in the ends of the sections.

The blocks are assembled when it is desired to build the wall, and an air space of suitable width provided between the inner and outer portions, such space varying in width according to the thickness of the wall and the climate where the building is being built. As each course of blocks is laid I provide plates 4, preferably of cast metal, having a series of pins or lugs 5 on each side thereof, adapted to slip into the sockets 3 in the ends of the abutting blocks, the plate intermediate to the pins corresponding substantially to the width of the joint and the usual filling material, such as mortar or cement, being filled in around the edges of the plate in the usual way. The plate 4 will bridge the air space between the block sections and hold the said sections in proper alinement and form a rigid substantial bond between the inner and outer surfaces of the wall and the diagonal arrangement of the lugs will prevent laterally twisting or racking of the wall.

I claim as my invention:

A wall composed of artificial blocks, each block comprising two sections or parts having a vertical air space between them and each section having sockets in its ends extending lengthwise thereof, and a plate arranged vertically in the joint between the ends of abutting blocks and having corner lugs projecting outwardly on each side of the plate in a direction substantially at right angles to the plane of the plate and fitting within said sockets and said lugs being diagonally arranged on said plate whereby they will brace and stiffen the wall and prevent lateral twisting and racking of the same.

In witness whereof, I have hereunto set my hand this 20th day of January 1906.

WALLACE L. DOW.

Witnesses:
     RICHARD PAUL,
     C. MACNAMARA.